US012654252B2

(12) United States Patent
Munemura et al.

(10) Patent No.: US 12,654,252 B2
(45) Date of Patent: Jun. 16, 2026

(54) ELEMENT, METHOD OF FRICTION ELEMENT WELDING, AND METHOD OF MANUFACTURING FRICTION-ELEMENT-WELDED JOINT

(71) Applicant: JFE STEEL CORPORATION, Tokyo (JP)

(72) Inventors: Naoaki Munemura, Tokyo (JP); Yasuaki Okita, Tokyo (JP); Hiroshi Matsuda, Tokyo (JP); Yoshiaki Murakami, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 133 days.

(21) Appl. No.: 18/282,359

(22) PCT Filed: Mar. 22, 2022

(86) PCT No.: PCT/JP2022/013081
§ 371 (c)(1),
(2) Date: Sep. 15, 2023

(87) PCT Pub. No.: WO2022/202788
PCT Pub. Date: Sep. 29, 2022

(65) Prior Publication Data
US 2024/0149372 A1 May 9, 2024

(30) Foreign Application Priority Data
Mar. 24, 2021 (JP) ................................. 2021-050332

(51) Int. Cl.
B23K 20/00 (2006.01)
B23K 20/12 (2006.01)

(52) U.S. Cl.
CPC ........ B23K 20/1255 (2013.01); B23K 20/125 (2013.01); B23K 20/129 (2013.01)

(58) Field of Classification Search
CPC ............. B23K 20/129; B23K 20/1295; B23K 20/127; B23K 11/0066; B23K 35/0288;
(Continued)

(56) References Cited

U.S. PATENT DOCUMENTS 2,982,166 A * 5/1961 Hobbs ................. F16B 25/0015
411/959
3,175,454 A * 3/1965 Morse ................... F16B 33/004
411/542
(Continued)

FOREIGN PATENT DOCUMENTS

CN 101142048 A 3/2008
CN 109483042 A 3/2019
(Continued)

OTHER PUBLICATIONS

Computer English Translation of DE19620814A1 (Year: 1997).*
(Continued)

*Primary Examiner* — Erin B Saad
(74) *Attorney, Agent, or Firm* — Oliff PLC

(57) ABSTRACT

In performing friction element welding of a sheet set constituted by two or more metal sheets, an element is press penetrated into the sheet set. The element may include a round columnar mandrel; a disc-shaped collar provided at an upper end face of the mandrel; and a conical pin extending from a lower end face of the mandrel. The element has a plurality of fluidized-metal discharge grooves arranged spirally in a flat area of the lower end face of the mandrel, the flat area excluding the pin. Alternatively, the element may include a round columnar mandrel having a lower end face that forms a conical face with an apical angle $\alpha m$, the conical face having one or more pairs of chippings discharge
(Continued)

(a)

(b)

grooves or having a plurality of cutting edges, the chippings discharge grooves each extending in a curved manner from an apex of the conical face.

6 Claims, 3 Drawing Sheets

(58) Field of Classification Search
CPC ................ B23K 11/0053; B23K 20/12; B23K 2103/166; B23K 2103/172
See application file for complete search history.

(56) References Cited

U.S. PATENT DOCUMENTS

| | | | | |
|---|---|---|---|---|
| 3,241,422 | A * | 3/1966 | Heimovics | F16B 33/004 411/959 |
| 3,399,589 | A * | 9/1968 | Breed | F16B 33/004 411/428 |
| 3,468,732 | A * | 9/1969 | Hewitt | B29C 65/0672 156/154 |
| 4,609,317 | A * | 9/1986 | Dixon | B65D 19/38 29/523 |
| 4,705,441 | A * | 11/1987 | Arnold | F16B 35/048 411/413 |
| 4,948,319 | A * | 8/1990 | Day | F16B 37/14 411/908 |
| 5,487,633 | A * | 1/1996 | Roberts | F16B 25/0047 411/399 |
| 6,764,262 | B1 * | 7/2004 | Hargis | F16B 43/001 411/371.1 |
| 7,329,077 | B2 * | 2/2008 | Curtis | F16B 35/06 411/188 |
| 8,043,021 | B2 * | 10/2011 | Birkelbach | B23K 20/129 228/114.5 |
| 9,056,370 | B1 * | 6/2015 | Matlack | F16L 55/1141 |
| 9,068,583 | B2 * | 6/2015 | Bray | F16B 19/008 |
| 9,452,491 | B1 * | 9/2016 | Littell | F16L 55/13 |
| 9,568,035 | B2 * | 2/2017 | West | F16J 15/14 |
| 9,919,379 | B1 * | 3/2018 | Jang | F16B 5/08 |
| 10,293,428 | B2 * | 5/2019 | Spinella | B23K 11/0066 |
| 10,593,034 | B2 * | 3/2020 | Spinella | B23K 11/0066 |
| 10,710,193 | B2 * | 7/2020 | Werkmeister | B23K 35/0255 |
| 11,346,388 | B2 * | 5/2022 | Dissing | F16B 25/0057 |
| 11,698,091 | B2 * | 7/2023 | Hill | B23K 11/0066 228/113 |
| 11,913,486 | B2 * | 2/2024 | Weckerle | F16B 25/0021 |
| 12,104,643 | B2 * | 10/2024 | Hill | F16B 5/08 |
| 2004/0118900 | A1 | 6/2004 | Stevenson et al. | |
| 2005/0178816 | A1 * | 8/2005 | Stevenson | B23K 20/127 228/2.1 |
| 2005/0244249 | A1 * | 11/2005 | Sussenbach | F16B 25/0047 411/411 |
| 2006/0213954 | A1 * | 9/2006 | Ruther | B21J 15/027 228/114.5 |
| 2007/0172335 | A1 | 7/2007 | Christ | |
| 2007/0295698 | A1 * | 12/2007 | Hengel | B23K 11/14 219/93 |
| 2008/0253829 | A1 | 10/2008 | Birkelbach | |
| 2011/0289752 | A1 * | 12/2011 | Werthwein | F16B 25/106 411/386 |
| 2012/0107070 | A1 * | 5/2012 | Bongartz | F16B 25/106 411/378 |
| 2013/0047414 | A1 * | 2/2013 | Werthwein | F16B 25/0078 29/525.12 |
| 2013/0094896 | A1 | 4/2013 | Christ et al. | |
| 2018/0154426 | A1 * | 6/2018 | Xiao | B23K 20/22 |
| 2018/0162097 | A1 * | 6/2018 | Blaski | B32B 15/088 |
| 2020/0300283 | A1 | 9/2020 | Fröhlich et al. | |
| 2023/0304521 | A1 * | 9/2023 | Hill | B23K 35/0288 |

FOREIGN PATENT DOCUMENTS

| | | | |
|---|---|---|---|
| CN | 210254681 | U | 4/2020 |
| DE | 20 2005 017 524 | U1 | 12/2005 |
| DE | 102009006775 | A1 | 10/2009 |
| JP | 2007-196291 | A | 8/2007 |
| JP | 2009-208138 | A | 9/2009 |
| JP | 2013-527804 | A | 7/2013 |
| JP | 2013534994 | A | 9/2013 |
| JP | 2021-504147 | A | 2/2021 |
| KR | 20160082288 | A | 7/2016 |
| WO | 02/062518 | A1 | 8/2002 |
| WO | 2017165814 | A2 | 9/2017 |
| WO | 2020/0256030 | A1 | 12/2020 |

OTHER PUBLICATIONS

Apr. 29, 2025 Office Action issued in Korean Patent Application No. 10-2023-7031222.

Jun. 24, 2024 Extended European Search Report issued in European Patent Application No. 22775571.7.

Jun. 7, 2022 International Search Report issued in International Application No. PCT/JP2022/013081.

Skovron et al., "Investigation of the Cleaning and Welding Steps From the Friction Element Welding Process". ASME, Manufacturing Science and Engineering Conference, Jun. 4-8, 2017, MSEC2017-2786.

Sep. 27, 2025 Office Action issued in Chinese Patent Application No. 202280021109.6.

Mar. 28, 2026 Office Action issued in Chinese Patent Application No. 202280021109.6 with concise statement of relevance.

* cited by examiner (a)

(b)

(a)

(b)

(a)

(b)

ELEMENT, METHOD OF FRICTION ELEMENT WELDING, AND METHOD OF MANUFACTURING FRICTION-ELEMENT-WELDED JOINT

TECHNICAL FIELD

This application relates to friction element welding abbreviated to FEW, particularly to an element suitable for friction element welding intended to join together a stack of two or more metal sheets including any of steel sheets (for example, ordinary steel sheets, high-tensile strength steel sheets, and the like) and light metal sheets (for example, aluminum sheets, aluminum alloy sheets, copper sheets, and the like); and to a method of friction element welding and a method of manufacturing a friction-element-welded joint both using the element.

¥BACKGROUND

In recent years, studies to cope with environmental problems such as global warming have been in progress in various fields. In the automobile industry, techniques have been developed to reduce fuel consumption (that is, to improve fuel efficiency) and thus reduce $CO_2$ emissions. Examples of such techniques that have been put to practical use include a technique of combining an internal combustion engine and an electric motor (a so-called hybrid technique), and a technique in which the weight of the vehicle body is reduced by employing high strength steel sheets, also called ultra-high-tensile strength steel sheets, for reduction in the volume of steel sheets to be used, aiming to improve fuel efficiency and increase the safety of the driver and passengers.

To achieve further weight reduction of the vehicle body, another technique has also been studied in which light metal materials (any of aluminum alloy sheets, copper sheets, and the like, for example) are employed in replacement of some of the steel materials. Mass production of such a vehicle body on a manufacturing line requires, for example, a technique of firmly joining a steel frame, forming a supporting structure of the vehicle body, and a member made of light metal to each other.

In known techniques, since steel sheets (steel materials) are used for vehicle bodies, general-purpose melt welding methods such as arc welding, resistance spot welding, and the like are employed. However, such general-purpose melt welding methods cannot be employed for the above-described joining of a steel material and a light metal material. For example, when a high strength steel sheet and an aluminum alloy sheet are joined together by a melt welding method, an intermetallic compound of Fe and Al is formed, resulting in a problem of an extremely brittle joined part.

Accordingly, studies on a technique of joining a steel sheet and a light metal sheet without melting the two have been in progress. One of representative examples of such a technique is disclosed by Non Patent Literature 1, in which friction element welding is performed using a joining component (hereinafter referred to as element) made of metal. In this technique, metal sheets are stacked as a sheet set and are joined together by pressing an element that is being rotated at a high speed into the sheet set (such a process is hereinafter referred to as press penetration).

As another example, a connecting element (an element) for friction welding connection is disclosed by Patent Literature 1. This element (connecting element) includes a round columnar mandrel, a collar attached to the mandrel, and a pin serving as a centering member and projecting from a substantially flat end face of the mandrel on a side remote from the collar. Preferably, the mandrel may have a recess surrounding the centering member and receiving a softened material that is pushed away by the centering member, and the pin may have a round columnar or conical shape. With the element disclosed by Patent Literature 1, in the press penetration of the element into a sheet set, the apex of the pin first comes into contact with the sheet set, and the pin rotates at a high speed while being retained at that position. Thus, frictional heat is generated concentratedly at a predetermined position.

CITATION LIST

Patent Literature

PTL 1: Japanese Unexamined Patent Application Publication (Translation of PCT Application) No. 2013-527804

Non Patent Literature

NPL 1: Jamie D. Skovron, Brandt J. Ruszkiewicz, and Laine Mears: "INVESTIGATION OF THE CLEANING AND WELDING STEPS FROM THE FRICTION ELEMENT WELDING PROCESS" ASME 2017 12th International Manufacturing Science and Engineering Conference collocated with the JSME/ASME 2017 6th International Conference on Materials and Processing, Jun. 4-8, 2017, Los Angeles, California, USA.

SUMMARY

Technical Problem

However, the following problem has been found in the above known technique. The position of the central axis of the pin tends to fluctuate significantly in the step of generating frictional heat by rotating the element at a high speed while keeping the apex of the pin in contact with the top sheet. Accordingly, the frictional heat is dispersed and not concentrated at a predetermined position of the top sheet. Therefore, the top sheet is not softened easily. Consequently, the mandrel of the element fails to penetrate through the top sheet, lacking the capability of penetration and making the joining of the sheet set difficult. The above phenomenon is pronounced particularly when the known technique is applied to a sheet set in which not only the bottom sheet but also the top sheet is a steel sheet.

An object of the disclosed embodiments is to solve the above problem in the known technique and to provide an element suitable for friction element welding of a sheet set obtained by stacking two or more metal sheets.

Solution to Problem

To achieve the above object, the present inventors have conducted intensive studies on an element that is applicable to friction element welding of a sheet set constituted by two metal sheets and in which both the bottom sheet and the top sheet are metal sheets.

The top sheet in the sheet set constituted by two metal sheets is a metal sheet with which the apex of the pin first comes into contact before the mandrel of the element is press penetrated into the sheet set. To perform friction element welding on such a sheet set, frictional heat needs to be generated concentratedly at a predetermined position by rotating the element at a high speed with no fluctuation in the point of contact of the apex of the pin. Therefore, the present inventors conducted an experiment to observe in detail what happened when the element was rotated at a high speed with the apex of the pin thereof being in contact with a predetermined point of the top sheet.

Consequently, the following has been found. As the apex of the pin rotating at a high speed comes into contact with the top sheet and is further press penetrated thereinto, the metal sheet (top sheet) is chipped by an amount equivalent to the volume of the pin that has been press penetrated into the top sheet. When the chipped metal sheet (chippings) is smoothly discharged, the pin is successfully press penetrated into the top sheet with its apex retained at a predetermined position, allowing the lower end face of the mandrel to come into contact with the top sheet. When the element continues to rotate at a high speed with no fluctuation in its position thereafter, the generated frictional heat is concentrated on that position, where the metal sheet (the top sheet) is softened to easily undergo plastic flow. Furthermore, when the softened metal (i.e., the top sheet) thus become flowable is smoothly discharged, the mandrel is successfully pressed into and penetrates through the top sheet.

In short, it has been found that when the shape of the tip of the element is improved, friction element welding is applicable to a sheet set constituted by two or three or more metal sheets. In particular, regarding a sheet set constituted by two or three or more metal sheets including a steel sheet serving as the top sheet, employing the above shape of the tip facilitates the penetration.

Specifically, it has been found that friction element welding ensures the joining of a sheet set constituted by two metal sheets when the mandrel has a groove (hereinafter referred to as fluidized-metal discharge groove) for discharging chippings generated from the top sheet by the pin of the element and for discharging the flowable metal resulting from the plastic flow of the top sheet (such metal is hereinafter referred to as fluidized metal).

Furthermore, it has been conceived that when the lower end face of the mandrel forms a conical face with an apical angle αm and when the conical face has a groove (chippings discharge groove) for discharging chippings or the like or further has a cutting edge, more smooth friction element welding of a sheet set constituted by various steel sheets is achieved.

The disclosed embodiments are based on the above findings and have been completed with further studies. Specifically, the gist of the disclosed embodiments is as follows.

[1] An element to be used in friction element welding of a sheet set obtained by stacking two or more metal sheets, the friction element welding being performed by press penetrating the element into the sheet set while rotating the element, the element comprising a round columnar mandrel to be press penetrated into the sheet set in the friction element welding; a disc-shaped collar provided at an upper end face of the mandrel; and a conical pin provided at a lower end face of the mandrel and having a center axis coinciding with a center axis of the mandrel, the conical pin having an apical angle α, the element having a plurality of fluidized-metal discharge grooves arranged spirally or radially in a flat area of the lower end face of the mandrel, the flat area excluding the pin.

[2] An element to be used in friction element welding of a sheet set obtained by stacking two or more metal sheets, the friction element welding being performed by press penetrating the element into the sheet set while rotating the element, the element comprising a round columnar mandrel to be press penetrated into the sheet set in the friction element welding; and a disc-shaped collar provided at an upper end face of the mandrel, the mandrel having a lower end face that forms a conical face with an apical angle αm, the conical face having one or more pairs of chippings discharge grooves or further having a plurality of cutting edges, the chippings discharge grooves each extending in a curved manner or being arranged radially from an apex of the conical face.

[3] The element according to [1], wherein a distance L (mm) from a bottommost end of an outer peripheral portion of the collar to an apex of the pin in a direction parallel to the center axis satisfies Expression (1) below:

$$(T_{TOTAL}-T_{BOTTOM})+0.02 \text{ mm} \leq L \leq (T_{TOTAL}-T_{BOTTOM})+4 \text{ mm} \tag{1}$$

where $T_{TOTAL}$: a total thickness (mm) of the sheet set, and $T_{BOTTOM}$: a thickness (mm) of a bottom sheet included in the sheet set.

[4] The element according to [2], wherein a distance L (mm) from a bottommost end of an outer peripheral portion of the collar to the apex of the lower end face of the mandrel in a direction parallel to the center axis satisfies Expression (1) below:

$$(T_{TOTAL}-T_{BOTTOM})+0.02 \text{ mm} \leq L \leq (T_{TOTAL}-T_{BOTTOM})+4 \text{ mm} \tag{1}$$

where $T_{TOTAL}$: a total thickness (mm) of the sheet set, and $T_{BOTTOM}$: a thickness (mm) of a bottom sheet included in the sheet set.

[5] The element according to any of [1] to [4], wherein at least a portion of an outer surface of the element is provided with coating made of a wear-resistant material.

[6] A method of friction element welding in which a sheet set obtained by stacking two or more metal sheets is joined together by press penetrating the element according to any of [1] to [5] into the sheet set while rotating the element.

[7] The method of friction element welding according to [6], wherein the sheet set obtained by stacking two or more metal sheets is a sheet set in which both a bottom sheet and a top sheet are steel sheets.

[8] A method of manufacturing a friction-element-welded joint in which a friction-element-welded joint is manufactured by joining together a sheet set obtained by stacking two or more metal sheets, the sheet set being joined by press penetrating the element according to any of [1] to [5] into the sheet set while rotating the element.

[9] The method of manufacturing a friction-element-welded joint according to [8], wherein the sheet set obtained by stacking two or more metal sheets is a sheet set in which both a bottom sheet and a top sheet are steel sheets.

Advantageous Effects

According to the disclosed embodiments, regardless of the kinds of the metal sheets, friction element welding is achieved not only for a sheet set obtained by stacking two metal sheets serving as the bottom sheet and the top sheet, but also for a sheet set obtained by stacking three or more steel sheets, or a sheet set obtained by inserting one or more light metal sheets between two steel sheets serving as the bottom sheet and the top sheet. Thus, an excellent industrial effect is produced.

DETAILED DESCRIPTION

Figure 1:
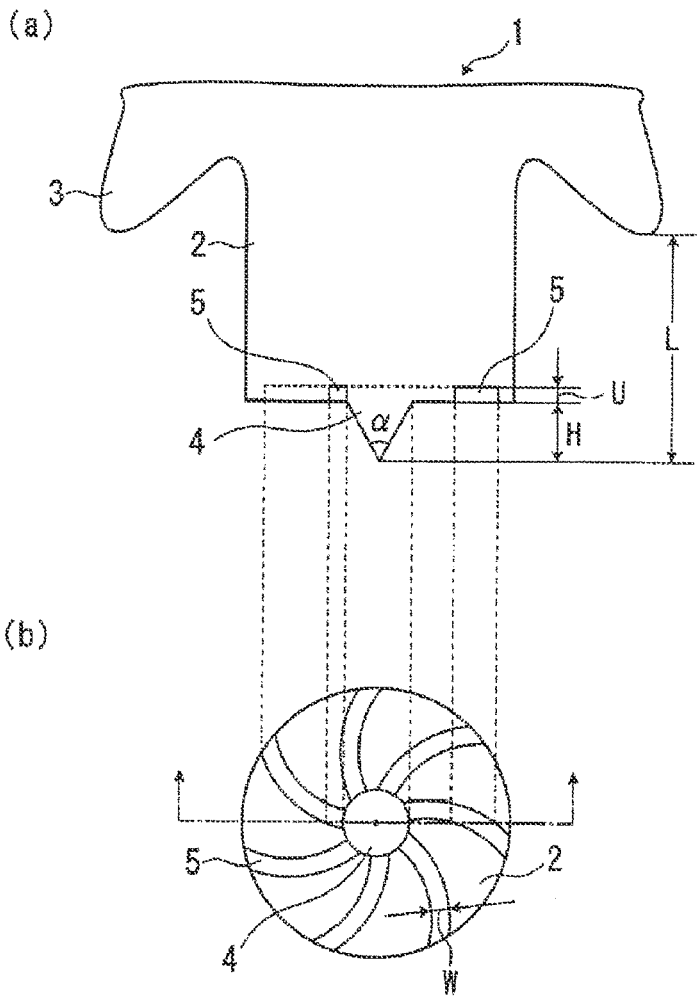
FIG. 1 schematically illustrates an example of the element according to the disclosed embodiments and includes diagram (a), which is a sectional view of a mandrel thereof; and diagram (b), which is a plan view of the mandrel.

As illustrated in FIG. 1, an element 1 according to the disclosed embodiments includes a round columnar mandrel 2, which is to be press penetrated into a sheet set on which friction element welding is to be performed; a disc-shaped collar 3, which is provided at one end face (hereinafter referred to as upper end face) of the mandrel 2; and a conical pin 4, which is provided at the other end face (hereinafter referred to as lower end face) of the mandrel 2.

The diameter of the collar 3 is greater than the diameter of the mandrel 2. An outer peripheral portion of the collar 3 bulges outward from the outer periphery of the mandrel 2. The outer peripheral portion of the collar 3 may preferably be inclined or curved downward.

The diameter of the bottom face of the pin 4 (the face abutting the lower end face of the mandrel 2) is smaller than the diameter of the mandrel 2. The pin 4 is positioned such that the center axis (that is, the center of the bottom face) thereof coincides with the center axis of the mandrel 2. Therefore, the lower end face of the mandrel 2 excluding the pin 4 forms a flat area (portion). The flat area (portion) adjoining the pin 4 has fluidized-metal discharge grooves 5, which are arranged spirally or radially.

When the number of fluidized-metal discharge grooves 5 is too small, smooth discharge of chippings and fluidized metal generated by press penetrating the element 1 rotated at a high speed into the sheet set may be hindered. Therefore, the number of fluidized-metal discharge grooves 5 may preferably be two or more. On the other hand, when the number of fluidized-metal discharge grooves 5 is too large, the frictional heat generated in the press penetration of the element 1 may be insufficient. Therefore, the number of fluidized-metal discharge grooves 5 may preferably be ten or smaller, more preferably 6 or smaller.

When the width, W (mm), of the fluidized-metal discharge grooves 5 is too small, smooth discharge of chippings and fluidized metal generated by press penetrating the element 1 into the sheet set may be hindered. Therefore, the width W of the fluidized-metal discharge grooves 5 may preferably be 0.01 mm or greater. More preferably, the width W of the fluidized-metal discharge grooves 5 may be 0.5 mm or greater. On the other hand, when the width W of the fluidized-metal discharge grooves 5 is too large, the frictional heat generated by press penetrating the element 1 into the sheet set may be insufficient. Therefore, the width W of the fluidized-metal discharge grooves 5 may preferably be 3 mm or smaller. More preferably, the width W of the fluidized-metal discharge grooves 5 may be 1 mm or smaller.

When the depth, U (mm), of the fluidized-metal discharge grooves 5 is too small, smooth discharge of chippings and fluidized metal generated by press penetrating the element 1 into the sheet set is hindered. Therefore, the depth U of the fluidized-metal discharge grooves 5 may preferably be 0.01 mm or greater. More preferably, the depth U of the fluidized-metal discharge grooves 5 may be 0.5 mm or greater. On the other hand, when the depth U of the fluidized-metal discharge grooves 5 is too large, the mandrel 2 tends to be deformed by press penetrating the element 1 into the sheet set. Therefore, the depth U of the fluidized-metal discharge grooves 5 may preferably be 3 mm or smaller. More preferably, the depth U of the fluidized-metal discharge grooves 5 may be 2 mm or smaller.

Adjusting the number of fluidized-metal discharge grooves 5 and the width W and the depth U of the fluidized-metal discharge grooves 5 to fall within the above preferable ranges enables the press penetration of the element 1 into the sheet set with smooth discharge of chippings and fluidized metal. However, when the area of the portion where the fluidized-metal discharge grooves 5 are provided (that is, the size of the flat area of the lower end face of the mandrel 2 excluding the pin 4) is too small, the press penetration of the element 1 is hindered. Therefore, the area of the bottom face of the pin 4 is adjusted by specifying the apical angle, a, and the height, H, of the pin 4.

When the apical angle $\alpha$ of the pin 4 is too small, the pin 4 tends to be damaged in the press penetration of the element 1 into the sheet set. In such a case, the position of the center axis of the pin 4 tends to fluctuate. Therefore, the apical angle $\alpha$ of the pin 4 may preferably be 30° or greater. More preferably, the apical angle $\alpha$ of the pin 4 may be 120° or greater. On the other hand, when the apical angle $\alpha$ of the pin 4 is too large, the area of the lower end face of the mandrel 2 excluding the pin 4 is too small, leading to insufficiency in the total length of the fluidized-metal discharge grooves 5. In such a case, smooth discharge of chippings and fluidized metal may be hindered. Therefore, the apical angle $\alpha$ of the pin 4 may preferably be within a range below 180°. More preferably, the apical angle $\alpha$ of the pin 4 may be 160° or smaller.

When the height H (mm) of the pin 4 is too small, the pin 4 fails to reach a satisfactory depth in the press penetration of the element 1 into the sheet set. In such a case, the position of the center axis of the pin 4 tends to fluctuate. Therefore, the height H of the pin 4 may preferably be 0.01 mm or greater. More preferably, the height H of the pin 4 may be 0.1 mm or greater. On the other hand, when the height H of the pin 4 is too large, the area of the lower end face of the mandrel 2 excluding the pin 4 is too small, leading to insufficiency in the total length of the fluidized-metal discharge grooves 5. In such a case, smooth discharge of chippings and fluidized metal may be hindered. Therefore, the height H of the pin 4 may preferably be 3 mm or smaller. More preferably, the height H of the pin 4 may be 1 mm or smaller.

In view of performing friction element welding using the above element 1, when the wear resistance of the pin 4 and the mandrel 2 is increased, efficient friction element welding is to be achieved. Accordingly, at least the outer surface of the pin 4 and the lower end face of the mandrel 2 may preferably be provided with coating made of a wear-resistant material. The wear-resistant material is not particularly specified as long as the material has desired performance, such as WC, TiN, or other like ceramics, heat-resistant steel, or hardening treatment such as nitriding or the like.

Figure 2:
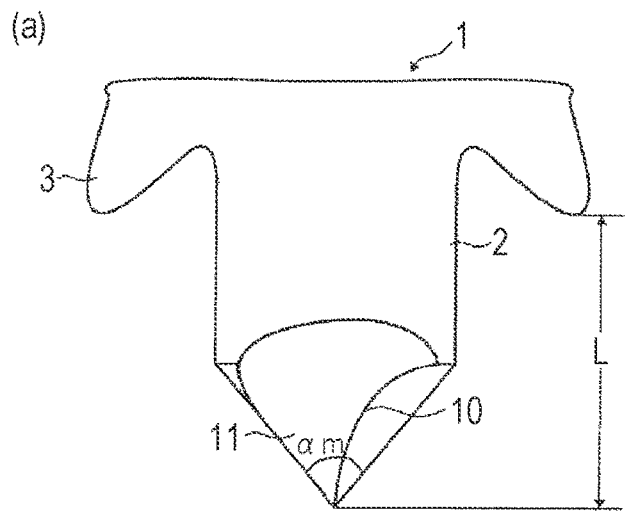
FIG. 2 schematically illustrates another example of the element according to the disclosed embodiments and includes diagram (a), which is a side view of a mandrel thereof; and diagram (b), which is a plan view of the mandrel.
Figure 2:
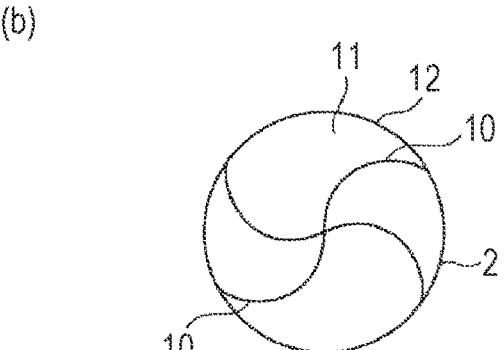

Another embodiment of the element 1 according to the disclosed embodiments is illustrated in FIG. 2. The element 1 illustrated in FIG. 2 has, at the lower end of the mandrel 2, a pair of cutting edges defined by the point angle of the mandrel 2. The pair of cutting edges forms a twist drill for metalworking, with curved ridges each extending from the tip to the outer peripheral edge thereof. Specifically, the lower end face forms a conical face with an apical angle $\alpha m$. The conical face has one or more pairs of chippings discharge grooves 11, which each extend in a curved manner from the apex; and cutting edges 10, which adjoin the chippings discharge grooves 11. In the disclosed embodiments, the conical face may have only the chippings discharge grooves 11 and does not necessarily need to have the cutting edges 10.

The chippings discharge grooves 11 may be arranged radially from the apex, instead of each extending in a curved manner. While the cutting edges 10 may each be curved as illustrated in FIG. 2(*b*), linear cutting edges are advantageous in terms of adjustment thereof.

When the apical angle $\alpha m$ of the conical face forming the lower end face of the mandrel 2 is too small, the mandrel 2 tends to be damaged in the press penetration of the element 1 into the sheet set. In such a case, the position of the center axis of the mandrel 2 tends to fluctuate. Therefore, the apical angle $\alpha m$ may preferably be 30° or greater. More preferably, the apical angle $\alpha m$ may be 120° or greater. On the other hand, when the apical angle $\alpha m$ is too large, the area of the conical face forming the lower end face of the mandrel 2 is too small, leading to insufficiency in the total length of the chippings discharge grooves 11. In such a case, smooth discharge of chippings and fluidized metal is hindered. Therefore, the apical angle $\alpha m$ may preferably be within a range below 180°. More preferably, the apical angle $\alpha m$ may be 160° or smaller.

Regarding the element 1 illustrated in FIG. 2, as with the element 1 illustrated in FIG. 1, the lower end face of the mandrel 2 may preferably be provided with coating made of a wear-resistant material.

Figure 3:
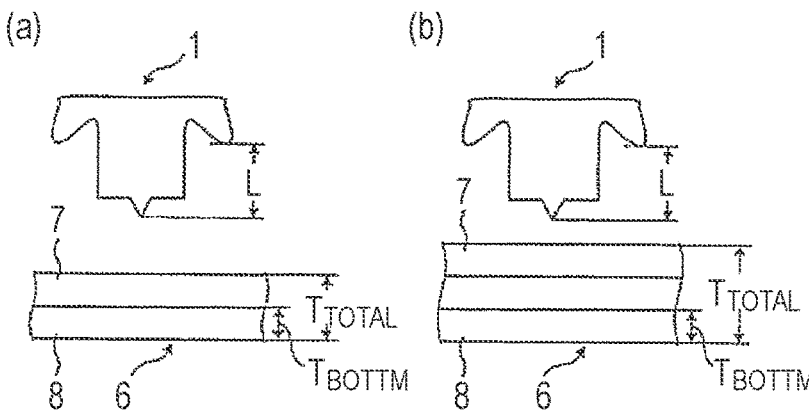
FIG. 3 schematically illustrates, in sectional view, examples of a sheet set to be joined together using the element illustrated in FIG. 1 and includes diagram (a), which illustrates a sheet set obtained by stacking two metal sheets; and diagram (b), which illustrates a sheet set obtained by stacking three metal sheets.

Now, the relationship between the sheet set and the element will be described with reference to FIG. 3. FIG. 3(*a*) is a sectional view of a sheet set obtained by stacking two metal sheets. FIG. 3(*b*) is a sectional view of a sheet set obtained by stacking three metal sheets. Here, the element 1 is the one illustrated in FIG. 1. In FIG. 3, the fluidized-metal discharge grooves 5, the cutting edges 10, and the chippings discharge grooves 11 of the element 1 are not illustrated.

FIG. 3(*a*) illustrates a sheet set 6 obtained by stacking two metal sheets serving as a top sheet 7 and a bottom sheet 8. FIG. 3(*b*) illustrates a sheet set 6 constituted by three metal sheets in total and obtained by inserting one metal sheet between a top sheet 7 and a bottom sheet 8. The disclosed embodiments are also applicable to a sheet set (not illustrated) constituted by four or more metal sheets in total and obtained by inserting two or more metal sheets between a top sheet 7 and a bottom sheet 8.

To perform friction element welding of each of the sheet sets 6 illustrated in FIG. 3 using the element 1 according to the disclosed embodiments, the mandrel 2 needs to penetrate through the top sheet 7 and reach the bottom sheet 8. However, during the press penetration of the element 1, the pin 4 and the mandrel 2 or the mandrel 2 is softened by frictional heat, undergoes plastic flow, and is discharged through the fluidized-metal discharge grooves 5. Therefore, when a distance L is too small (for example, distance $L < (T_{TOTAL} - T_{BOTTOM}) + 0.02$ mm), a problem of failure in reaching the bottom sheet 8 arises. Hence, it is preferable to use a mandrel designed such that the distance L (mm) from the bottommost end of the outer peripheral portion of the collar 3 to the apex of the pin 4 is equal to or greater than the difference between the total thickness, $T_{TOTAL}$ (mm), of the sheet set 6 and the thickness, $T_{BOTTOM}$ (mm) of the bottom sheet 8 $(T_{TOTAL} - T_{BOTTOM}) + 0.02$ mm. More preferably, the above distance L (mm) may be equal to or greater than the difference between the total thickness $T_{TOTAL}$ (mm) of the sheet set 6 and the thickness $I_{BOTTOM}$ (mm) of the bottom sheet 8 $(T_{TOTAL} - T_{BOTTOM}) + 0.2$ mm, much more preferably equal to or greater than the difference between the total thickness $T_{TOTAL}$ (mm) of the sheet set 6 and the thickness $T_{BOTTOM}$ (mm) of the bottom sheet 8 $(T_{TOTAL} - T_{BOTTOM}) + 0.5$ mm. Here, the distance L is the length in a direction parallel to the center axis of the mandrel 2. Thus, in friction element welding, when the element 1 is press penetrated into the top sheet 7 from above, the pin 4 successfully reaches the bottom sheet 8. On the other hand, when the distance L is too large, in the press penetration of the element 1, the mandrel 2 tends to deform (for example, to bend, twist, buckle, or the like) above the top sheet 7 (that is, before being press penetrated into the top sheet 7). In such a case, a problem of failure in press penetration arises. Hence, the distance L (mm) may preferably be equal to or smaller than $(I_{TOTAL} - I_{BOTTOM}) + 4$ mm. More preferably, the distance L (mm) may be equal to or smaller than $(T_{TOTAL} - I_{BOTTOM}) + 2$ mm, much more preferably equal to or smaller than $(T_{TOTAL} - I_{BOTTOM}) + 1.5$ mm. A distance, L (mm) in FIG. 2, in the direction parallel to the center axis from the bottommost end of the outer peripheral portion of the collar to the apex of the lower end face of the mandrel may also preferably be within the range defined for the above distance L.

Figure 4:
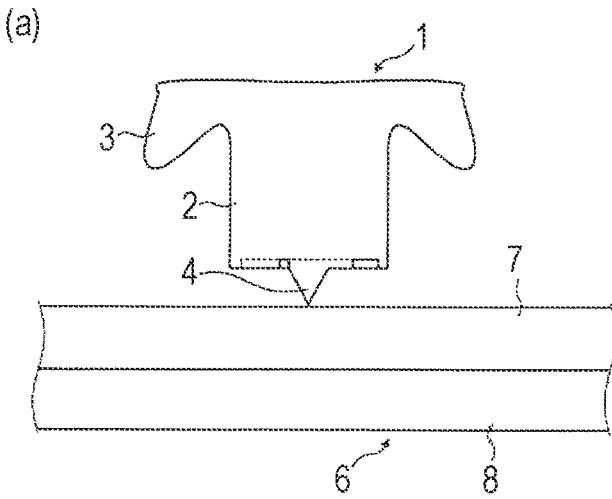
FIG. 4 schematically illustrates, in sectional view, an example in which a sheet set is to be joined together using the element illustrated in FIG. 1 and includes diagram (a), which illustrates a state before the press penetration of the element; and diagram (b), which illustrates a state after the press penetration of the element.
Figure 4:
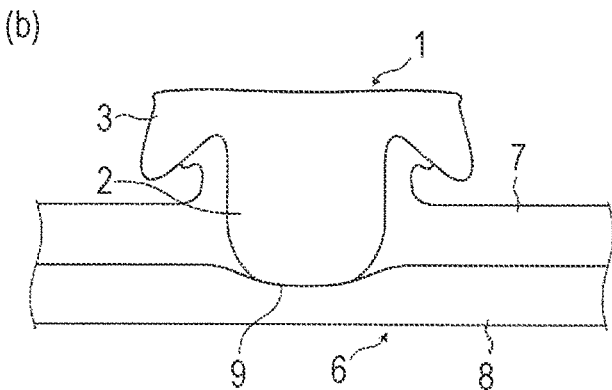

Referring now to FIG. 4, a procedure of performing friction element welding using the element 1 will be described. Here, the element 1 is the one illustrated in FIG. 1. FIG. 4 schematically illustrates, in sectional view, a case where a sheet set 6 is to be joined together using the element 1 (see FIG. 3(*a*)). FIG. 4(*a*) illustrates a state before the element 1 is press penetrated into the sheet set 6. FIG. 4(*b*) illustrates a state after the element 1 is press penetrated into the sheet set 6. In FIG. 4, the fluidized-metal discharge grooves 5, the cutting edges 10, and the chippings discharge grooves 11 of the element 1, and a rotary pressing machine for press penetrating the element 1 into the sheet set 6 are not illustrated.

In the press penetration of the element 1 into the sheet set 6, the element 1 rotating at a high speed is lowered from above the top sheet 7, and the apex of the pin 4 comes into contact with the top sheet 7 (see FIG. 4(*a*)). In this state, the center axis of the pin 4 (that is, the center axis of the mandrel 2) is perpendicular to the top sheet 7. As the element 1 rotating at a high speed continues to be lowered, the pin 4 is gradually press penetrated into the top sheet 7 from the apex thereof, whereby the center axis of the pin 4 that is regarded as the rotation axis of the element 1 is retained at a predetermined position. As the element 1 rotating at a high speed is further lowered, chippings resulting from the press penetration of the pin 4 are generated until the lower end face of the mandrel 2 comes into contact with the top sheet 7. With the rotation of the element 1, the chippings are discharged through the fluidized-metal discharge grooves 5 toward the lateral face of the mandrel 2.

As the element 1 rotating at a high speed further continues to be lowered, frictional heat is generated between the lower end face of the mandrel 2 and the top sheet 7 and between the lateral face of the element 1 and the top sheet 7. Meanwhile, the heated top sheet 7 is softened to undergo plastic flow. Then, the softened top sheet 7 flows through the fluidized-metal discharge grooves 5 and is discharged toward the lateral face of the mandrel 2. Thus, the press penetration of the element 1 is achieved in which the mandrel 2 reaches the bottom sheet 8 to cause plastic flow also in a surficial portion of the bottom sheet 8 (see FIG. 4(b)).

Inevitably, the mandrel 2 is also softened with the frictional heat. Therefore, by the time the mandrel 2 reaches the bottom sheet 8, the pin 4 and the fluidized-metal discharge grooves 5 are collapsed, not retaining the shapes they have had before the start of the press penetration (see FIGS. 1 and 2). When the press penetration is stopped, the top sheet 7, the bottom sheet 8, and the mandrel 2 that have been softened and fused to one another are then solidified, whereby an interface 9 is formed between the bottom sheet 8 and the mandrel 2.

During the press penetration of the mandrel 2, part of the top sheet 7 that has been discharged through the fluidized-metal discharge grooves 5 or the chippings discharge grooves 11 moves upward along the lateral face of the mandrel 2. This is because the bottom sheet 8 is located therebelow, where the movement is hindered. Thus, the top sheet 7 moves and projects into a free space thereabove but is constrained by the outer peripheral portion of the collar 3. Consequently, the top sheet 7 is fixed to the element 1. In short, when friction element welding is performed using the element 1 according to the disclosed embodiments on a sheet set 6 obtained by stacking two metal sheets, such as the one illustrated in FIG. 3(a), the bottom sheet 8 and the mandrel 2 are joined to each other at the interface 9, whereas the top sheet 7 is fixed to the mandrel 2 and the collar 3.

Likewise, when friction element welding is performed on a sheet set 6 obtained by stacking three metal sheets, such as the one illustrated in FIG. 3(b), or when friction element welding is performed on a sheet set obtained by stacking four or more metal sheets, the bottom sheet 8 and the mandrel 2 are joined to each other at the interface 9, whereas the top sheet 7 and the other metal sheets are fixed to the mandrel 2 and the collar 3.

In friction element welding using the element 1 according to the disclosed embodiments, the kinds of metal sheets to be stacked as a sheet set 6 is not particularly limited. However, when a steel sheet is employed as the bottom sheet 8, satisfactory frictional heat is generated between the bottom sheet 8 and the mandrel 2, whereby firm joining at the interface 9 is achieved.

Furthermore, since the element 1 according to the disclosed embodiments has the fluidized-metal discharge grooves 5 or the chippings discharge grooves 11, chippings of the top sheet 7 and the softened top sheet 7 are smoothly discharged. Therefore, friction element welding is achieved with no problem for a sheet set 6 in which not only the bottom sheet 8 but also the top sheet 7 is a steel sheet. Thus, a friction-element-welded joint that is formed of a firmly joined sheet set 6 is obtained.

The element to be provided by the disclosed embodiments is applicable with no problem to friction element welding of a sheet set constituted by two metal sheets serving as a bottom sheet that is a steel sheet and a top sheet that is a light metal sheet, a sheet set including a bottom sheet and a top sheet that are both steel sheets, or a sheet set constituted by three or more metal sheets and obtained by inserting one or more light metal sheets between a steel sheet serving as a bottom sheet and a light metal sheet serving as a top sheet. Each of the applications produces an advantageous effect of suppressing the occurrence of defective joining. In friction element welding performed on any of the above sheet sets using the element according to the disclosed embodiments, since the top sheet is soft, the pin penetrates into the top sheet with the center axis thereof retained at a predetermined position. Furthermore, frictional heat is concentratedly generated at that position, where the materials are softened to easily undergo plastic flow. Moreover, fluidized metal and chippings resulting from the top sheet are smoothly discharged through the fluidized-metal discharge grooves or the chippings discharge grooves provided in the mandrel. This also produces an advantageous effect of suppressing the occurrence of defective joining.

Now, the disclosed embodiments will be described in further details by providing examples. The following examples do not limit the disclosed embodiments, and all examples are included in the technical scope of the disclosed embodiments as long as they satisfy the essence of the disclosed embodiments.

EXAMPLES

Example 1

Friction element welding was performed on sheet sets each obtained by stacking two metal sheets (a top sheet and a bottom sheet), whereby two friction-element-welded joints were manufactured for each of the sheet sets. Elements 1 used were each shaped as the element 1 illustrated in FIG. 1, with an apical angle α of 140° and two fluidized-metal discharge grooves 5 arranged in a spiral manner. The mandrel 2 had a diameter of 4.55 mm.

Combinations of the top sheet and the bottom sheet are summarized in Table 1. The rotation speeds (rpm) of the elements used in the friction element welding and the pressing forces (kN) applied by the elements are summarized in Table 2. For comparison, friction element welding was also performed using elements 1 each having no fluidized-metal discharge grooves 5.

A section of the joined part in each of the resulting friction-element-welded joints was visually observed to evaluate the states of joining of the sheet sets. Any result in which the mandrel 2 penetrated through the top sheet 7 and was joined to the bottom sheet 8 (see FIG. 4(b)) was evaluated as favorable joining, represented by "○". Any result in which the mandrel 2 failed to penetrate through the top sheet 7 or failed to be joined to the bottom sheet 8 was evaluated as defective joining, represented by "x".

Any welded joint in the state of joining evaluated as favorable joining (○) was further subjected to a cross tension test, defined by JIS Z 3137, for examination of the strength of the welded joint. Any result with a strength of 6.0 kN or greater was graded as A, any result with a strength of 3.0 kN or greater but below 6.0 kN was graded as B, and any result with a strength of below 3.0 kN was graded as C.

Any sheet set in the state of joining evaluated as defective joining (x) was not subjected to the tension test and was graded as D. The order of favorableness of the welded joints is expressed as A>B>C>D. The results obtained as above are summarized in Table 2.

TABLE 1

| Sheet | Bottom sheet | | Top sheet | |
|---|---|---|---|---|
| set No. | Material | Thickness t | Material | Thickness t |
| a | 1470-MPa steel sheet | 1.6 mm | 980-MPa steel sheet | 1.0 mm |
| b | 1470-MPa steel sheet | 1.6 mm | 980-MPa steel sheet | 1.6 mm |
| c | 1470-MPa steel sheet | 1.6 mm | 1470-MPa steel sheet | 1.0 mm |
| d | 1180-MPa steel sheet | 1.6 mm | 980-MPa steel sheet | 1.0 mm |
| e | 1470-MPa steel sheet | 1.0 mm | 980-MPa steel sheet | 1.0 mm |
| f | 1470-MPa steel sheet | 1.6 mm | A5052 Al alloy sheet | 2.0 mm |

TABLE 2

| | | | Conditions for friction welding | | | Element | | | | Evaluation of joint | | | |
|---|---|---|---|---|---|---|---|---|---|---|---|---|---|
| | | | | | | | Fluidized-metal | | | | | | |
| | | | Rotation | Pressing | | | discharge | | | | | | |
| Joint No. | Sheet set | $\Delta T^*$ (mm) | speed (rpm) | force (kN) | Shape | grooves Yes/No | L (mm) | W (mm) | State of joining | Strength (kN) | Grade | Note |
| 1 | a | 1.0 | 6500 | 7 | FIG. 1 | Yes | 2.5 | 1.0 | ○ | 7.5 | A | Example |
| 2 | a | 1.0 | 6500 | 7 | FIG. 1 | Yes | 2.5 | 0.4 | ○ | 5.4 | B | Example |
| 3 | a | 1.0 | 6500 | 7 | FIG. 1 | No | 2.5 | — | x | — | D | Comparative example |
| 4 | b | 1.6 | 6500 | 7 | FIG. 1 | Yes | 2.5 | 1.0 | ○ | 2.8 | C | Example |
| 5 | b | 1.6 | 6500 | 7 | FIG. 1 | No | 2.5 | — | x | — | D | Comparative example |
| 6 | c | 1.0 | 6500 | 7 | FIG. 1 | Yes | 2.5 | 1.0 | ○ | 5.9 | B | Example |
| 7 | c | 1.0 | 6500 | 7 | FIG. 1 | No | 2.5 | — | x | — | D | Comparative example |
| 8 | d | 1.0 | 6500 | 7 | FIG. 1 | Yes | 2.5 | 1.0 | ○ | 7.3 | A | Example |
| 9 | d | 1.0 | 6500 | 7 | FIG. 1 | No | 2.5 | — | x | — | D | Comparative example |
| 10 | e | 1.0 | 6500 | 7 | FIG. 1 | Yes | 2.5 | 1.0 | ○ | 7.0 | A | Example |
| 11 | e | 1.0 | 6500 | 7 | FIG. 1 | No | 2.5 | — | x | — | D | Comparative example |
| 12 | f | 2.0 | 6500 | 7 | FIG. 1 | Yes | 2.5 | 1.0 | ○ | 1.0 | C | Example |
| 13 | a | 1.0 | 6500 | 7 | FIG. 1 | Yes | 1.1 | 1.0 | ○ | 2.9 | C | Example |

$^*\Delta T = (T_{TOTAL} - T_{BOTTOM})$
Total thickness of sheet set: $T_{TOTAL}$,
Thickness of bottom sheet: $T_{BOTTOM}$ The states of joining of the examples of the disclosed embodiments were all evaluated as favorable joining. Furthermore, the examples in which both the top sheet and the bottom sheet were steel sheets each provided a strength of 2.8 kN or greater as a welded joint. As for Joint No. 12, the state of joining was favorable "0", but the strength as the welded joint was 1.0 kN, which was lower than the above. This is considered to be because the top sheet was an aluminum alloy sheet and therefore had a lower strength as a base material than a top sheet made of a steel sheet. The states of joining of the comparative examples, deviating from the scope of the disclosed embodiments, were defective "x".

Example 2

Friction element welding was performed on sheet sets, summarized in Table 1, each obtained by stacking two metal sheets (a top sheet and a bottom sheet), whereby two friction-element-welded joints were manufactured for each of the sheet sets. Elements 1 used were each shaped as the element 1 illustrated in FIG. 2 and each included a mandrel designed such that the distance L from the bottommost end of the collar 3 to the apex of the lower end face of the mandrel 2 was 1 to 5 mm; the apical angle αm of the conical face forming the lower end face was 140°; and the conical face forming the lower end face had a pair of chippings discharge grooves 11 each extending in a curved manner from the apex, and two cutting edges 10. The mandrel 2 had a diameter of 4.55 mm.

The rotation speeds (rpm) of the elements used in the friction element welding and the pressing forces (kN) applied by the elements are summarized in Table 3. For comparison, friction element welding was also performed using elements 1 each having neither chippings discharge grooves 11 nor cutting edges 10.

As with the case of Example 1, a section of the joined part in each of the resulting friction-element-welded joints was visually observed to evaluate the states of joining of the sheet sets.

Any welded joint in the state of joining evaluated as favorable joining (○) was further subjected to a tension test, as with the case of Example 1, for finding the tensile strength of the welded joint, and was evaluated in the same manner as for Example 1. The results obtained as above are summarized in Table 3.

TABLE 3

| Joint No. | Sheet set | ΔT* (mm) | Conditions for friction welding | | | Element | | | Evaluation of joint | | | |
| | | | Rotation speed (rpm) | Pressing force (kN) | Shape | Presence of cutting blades and chippings discharge grooves | L (mm) | W (mm) | State of joining | Strength (kN) | Grade | Note |
|---|---|---|---|---|---|---|---|---|---|---|---|---|
| 14 | a | 1.0 | 6500 | 7 | FIG. 2 | Yes | 4.0 | 1.0 | ○ | 7.1 | A | Example |
| 15 | a | 1.0 | 6500 | 7 | FIG. 2 | Yes | 4.0 | 0.4 | ○ | 5.1 | B | Example |
| 16 | a | 1.0 | 6500 | 7 | FIG. 2 | No | 4.0 | — | x | — | D | Comparative example |
| 17 | b | 1.6 | 6500 | 7 | FIG. 2 | Yes | 5.0 | 1.0 | ○ | 2.4 | C | Example |
| 18 | b | 1.6 | 6500 | 7 | FIG. 2 | No | 5.0 | — | x | — | D | Comparative example |
| 19 | c | 1.0 | 6500 | 7 | FIG. 2 | Yes | 4.0 | 1.0 | ○ | 5.5 | B | Example |
| 20 | c | 1.0 | 6500 | 7 | FIG. 2 | No | 4.0 | — | x | — | D | Comparative example |
| 21 | d | 1.0 | 6500 | 7 | FIG. 2 | Yes | 4.0 | 1.0 | ○ | 7.1 | A | Example |
| 22 | d | 1.0 | 6500 | 7 | FIG. 2 | No | 4.0 | — | x | — | D | Comparative example |
| 23 | e | 1.0 | 6500 | 7 | FIG. 2 | Yes | 4.0 | 1.0 | ○ | 6.5 | A | Example |
| 24 | e | 1.0 | 6500 | 7 | FIG. 2 | No | 4.0 | — | x | — | D | Comparative example |
| 25 | f | 2.0 | 6500 | 7 | FIG. 2 | Yes | 5.0 | 1.0 | ○ | 1.5 | C | Example |
| 26 | a | 1.0 | 6500 | 7 | FIG. 2 | Yes | 1.0 | 1.0 | ○ | 2.1 | C | Example |

*ΔT = ($T_{TOTAL}$ − $T_{BOTTOM}$)
Total thickness of sheet set: $T_{TOTAL}$,
Thickness of bottom sheet: $T_{BOTTOM}$ The states of joining of the examples of the disclosed embodiments were all evaluated as favorable joining. Furthermore, the examples in which both the top sheet and the bottom sheet were steel sheets each provided a tensile strength of 2.1 kN or greater. As for Joint No. 25, the state of joining was favorable "○", but the strength as the welded joint was 1.5 kN, which was lower than the above. This is because the top sheet was an aluminum alloy sheet and therefore made the element worn down significantly during the penetration into the top sheet, resulting in an insufficient joint diameter. The states of joining of the comparative examples, deviating from the scope of the disclosed embodiments, were defective "x".

The invention claimed is:

1. An element to be used in friction element welding of a sheet set obtained by stacking two or more metal sheets, the friction element welding being performed by press penetrating the element into the sheet set while rotating the element, the element comprising:

a round columnar mandrel configured to be press penetrated into the sheet set in the friction element welding; and a disc-shaped collar provided at an upper end face of the mandrel, wherein:

the mandrel has a lower end face that forms a conical face with an apical angle αm, the conical face having:

one or more pairs of chippings discharge grooves, the chippings discharge grooves each extending in a curved manner starting at a common point at an apex of the conical face.

2. The element according to claim 1, wherein a distance L (mm) from a bottommost end of an outer peripheral portion of the collar to the apex of the lower end face of the mandrel in a direction parallel to the center axis of the pin satisfies Expression (1) below:

$$(T_{TOTAL} - T_{BOTTOM}) + 0.02 \text{ mm} \leq L \leq (T_{TOTAL} - T_{BOTTOM}) + 4 \text{ mm} \tag{1}$$

where:

$T_{TOTAL}$: a total thickness (mm) of the sheet set, and $T_{BOTTOM}$: a thickness (mm) of a bottom sheet included in the sheet set.

3. A method of manufacturing a friction-element-welded joint in which the friction-element-welded joint is manufactured by joining together a sheet set obtained by stacking two or more metal sheets, the method comprising:

press penetrating the element according to claim 1 into the sheet set while rotating the element.

4. The method of manufacturing a friction-element-welded joint according to claim 3, wherein a bottom sheet included in the sheet set and a top sheet included in the sheet set are both steel sheets.

5. A method of manufacturing a friction-element-welded joint in which the friction-element-welded joint is manufactured by joining together a sheet set obtained by stacking two or more metal sheets, the method comprising:

press penetrating the element according to claim 2 into the sheet set while rotating the element.

6. The method of manufacturing a friction-element-welded joint according to claim 5, wherein a bottom sheet included in the sheet set and a top sheet included in the sheet set are both steel sheets.

* * * * *